United States Patent [19]
Halpern

[11] 3,877,099
[45] Apr. 15, 1975

[54] DEBURRING TOOL

[76] Inventor: William Halpern, Haviland Rd., Harrison, N.Y.

[22] Filed: Feb. 19, 1974

[21] Appl. No.: 443,188

Related U.S. Application Data
[63] Continuation of Ser. No. 291,924, Sept. 25, 1972, abandoned.

[30] Foreign Application Priority Data
Nov. 20, 1971 Germany............................ 2157587

[52] U.S. Cl.................................... 10/140; 408/117
[51] Int. Cl.............................................. B23g 5/20
[58] Field of Search.............. 10/141 H, 141 R, 140; 408/117–119

[56] References Cited
UNITED STATES PATENTS

| | | | |
|---|---|---|---|
| 1,041,675 | 10/1912 | Robinson............................ | 408/119 |
| 2,797,421 | 7/1957 | Williams et al...................... | 408/119 |
| 2,949,618 | 8/1960 | Peyser et al. ....................... | 408/112 |
| 3,233,260 | 2/1966 | Halpern.............................. | 408/119 |
| 3,234,573 | 2/1966 | Halpern.............................. | 408/118 |

FOREIGN PATENTS OR APPLICATIONS

| | | | |
|---|---|---|---|
| 642,577 | 3/1937 | Germany............................. | 10/140 |

*Primary Examiner*—C. W. Lanham
*Assistant Examiner*—D. M. Gurley
*Attorney, Agent, or Firm*—Curtis, Morris & Safford

[57] ABSTRACT

A deburring device for a tapping tool having a shank, a thread cutting portion and axially extending chip flutes in the cutting portions, and a deburring and chamfering tool in which a securing ring is mountable on the shank of the tapping tool and a deburring head is connected thereto by a compression spring and is rotated with the tapping tool. The deburring head includes a mounting ring connected to the compression spring and a removable cutting ring having cutters with generally radially-extending cutting edges. As the deburring head rotates with the tapping tool during the tapping operation, it engages the workpiece and is pushed upwardly on the tapping tool and the spring is compressed. The cutting edges on the deburring head are not effective during the clockwise rotation of tapping, but upon reversal of the rotation to unscrew the tapping tool from the finished thread the cutting edges on the deburring head are effective to remove burrs and form a chamfer. During normal usage, the cutting edges on the deburring head must be resharpened from time to time. With the prior deburring device, to sharpen the deburring head, the deburring head must be removed with considerable difficulty. When the prior deburring device became dull, it was necessary to remove the deburring head from the spring and retaining collar attached to the tapping tool. This was a difficult, time consuming process. With the construction disclosed herein, the cutting or deburring head is easily removed from a mounting ring and quickly and easily replaced in its original position after resharpening.

1 Claim, 3 Drawing Figures

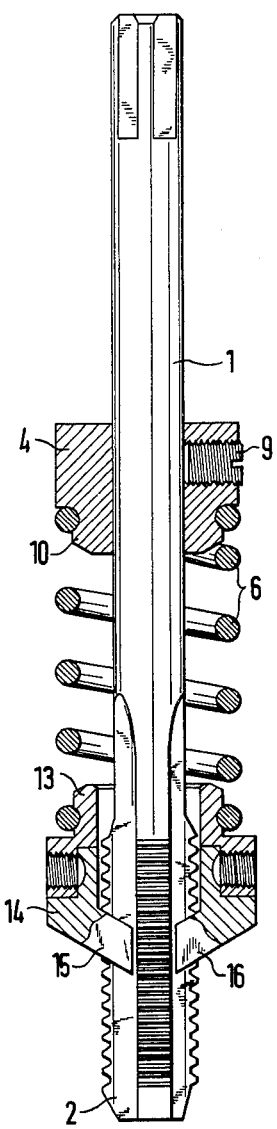
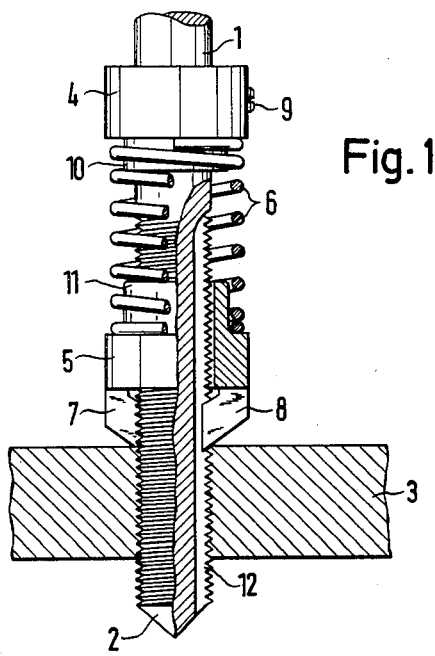
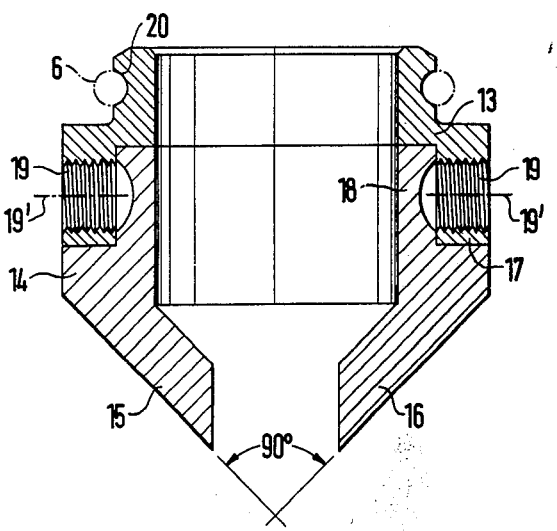
Fig. 1
Fig. 2
Fig. 3

DEBURRING TOOL

This is a continuation of application Ser. No. 291,924, filed Sept. 25, 1972, now abandoned.

This invention relates to deburring device, and particularly for tapping tools of the type disclosed in my U.S. Pat. No. 3,233,260.

An object of this invention is to overcome certain shortcomings of the construction shown in that patent. A further object is to provide for improved efficiency in the use of tools of that type. These and other objects will be in part obvious and in part pointed out below.

IN THE DRAWINGS

FIG. 1 is a side elevation with parts broken away of a deburring tool in accordance with my U.S. Pat. No. 3,233,360.

FIG. 2 is a side elevation with parts broken away of one embodiment of my present invention; and, FIG. 3 is a somewhat enlarged vertical section of the deburring head of FIG. 2.

The prior construction illustrated in FIG. 1 is shown mounted on a finishing tapping tool including a shank 1 and a threaded cutting portion 2. Axially extending chip grooves or flutes 12 are provided in the threaded portion of the tapping tool, two grooves being provided diametrically opposite one another. The tapping tool is illustrated tapping a hole in a workpiece 3. The deburring tool has a ring or collar 4 clamped to shank 1 by a set screw 9, and an annular deburring head 5 connected to collar 4 by a coil compression spring 6. The deburring head has cutters 7 and 8 which are positioned in the flutes in the tapping tool and provides a driving relationship whereby the deburring head turns with the tapping tool. The direction of the cutting edges on cutters 7 and 8 is opposite to the clockwise direction of the tapping process, so that the cutting edges slide over the rim of the hole in the workpiece when the tapping head is lowered onto the rim of the hole during the tapping process. However, when the rotation of the tapping tool is reversed to remove it from the finished thread, the cutting edges on cutters 7 and 8 are effective to deburr and chamfer the upper end of the hole in the workpiece. The upper end of spring 6 nests in a groove in the reduced bottom annular extension 10 of ring 4, and the lower end of the spring nests in a similar groove in the annular extension 11 of the deburring head 5, thus resiliently supporting the deburring head and permitting it to move axially with the cutters 7 and 8 sliding in the tapping tool flutes.

During normal use, the deburring tool is positioned on the tapping tool and its collar 4 is clamped to the tapping tool shank 1. The tapping tool is then mounted to perform successive tapping operations, involving rotating the tapping tool clockwise into a hole in a workpiece and then reversing the rotation to remove the tapping tool from the hole. As the tapping tool moves into the hole in the workpiece the chamfering tool rests upon the top of the hole so that spring 6 is compressed as the tapping tool and collar 4 move downwardly. FIG. 1 represents the position of the components when the tapping operation has been completed, at which time the rotation of the tapping tool is reversed. As indicated above, the reversed rotation causes the deburring tool to remove the burrs at the top of the hole and to form a chamfer around the hole. The forces with which the cutting edges engage the workpiece determines the rate at which the chamfer is formed, and during initial reverse rotation, there is fairly rapid cutting of the chamfer. However, as the tapping tool moves upwardly, the compression of the spring is reduced and eventually the deburring tool is moved away from the workpiece. In that way, the deburring tool forms a chamfer with a finished surface and of the size desired. However, it is very important to have the deburring tool mounted in the proper axial position on the tapping tool so that cutting edges are held against the workpiece with the proper force and for a sufficient period of time to produce the desired chamfer. For example, if collar 4 is mounted too far down on shank 1, the force of the spring will become too great and the chamfer will be larger than desired, and if the collar is mounted too high on the shank, there will be an insufficient chamfer.

As indicated above, with the prior construction, the sharpening of the cutting edges involves removal of the entire deburring tool from the tapping tool and the deburring tool must then be repositioned at the precise height on the tapping tool. That repositioning is time-consuming and difficult, particularly when a large number of tapping tools are mounted so as to operate together. The present invention overcomes that difficulty.

In the embodiment of the present invention of FIGS. 2 and 3, certain of the parts are the same as in FIG. 1 and they bear like reference numerals. The tapping tool has a shank 1 and a fluted thread-cutting portion 2, a mounting collar 4 clamped to shank 1 by a set of screws 9, and a spring 6 is mounted at its top in an annular groove in a bottom extension 10 or the collar 1. The deburring head has two parts, a mounting ring 13 and a cutter ring 14, and the cutting ring has cutters 15 and 16 which project into flutes in the tapping tool and which have cutting edges similar to those of the tool of FIG. 1. An annular skirt extension 17 (FIG. 3) on the mounting ring 13 surrounds the top portion 18 of the cutting ring with a snug sliding fit. Two diametrically spaced radial threaded bores with axes 19 extend through skirt 17, and two set screws 19 are screwed into the bores and have rounded ends which press against the surface of an annular groove in portion 18. Hence, the two parts of the deburring head are clamped together securely and form a structure equivalent of that of the deburring head 5 in FIG. 1. However, cutting ring 14 is of hardened tool steel, whereas mounting ring 13 is of mild steel. Hence, the cutter ring provides a very rigid structure which is not deformed by the tightening of screws 19 or by normal usage.

During normal usage, the tapping tool with its deburring tool is positioned along with many other similar tapping tools, for example, as part of a tool assembly, for use in tapping holes successively in workpieces. The positioning of each collar 4 on its shank 1 is such that the precise chamfer is formed during the removal of the tapping tool from each threaded hole. When the cutting edges on the cutter portions 15 and 16 require resharpending, screws 19 are loosened sufficiently to withdraw them into their bores and the cutting ring 14 is drawn downwardly away from the mounting ring 13 and the tapping tool. The cutting edges are then ground to the desired sharpness and the cutting ring is returned to its proper position and screws 19 are again tightened. It is thus seen that the tool assembly is quickly and easily returned to its original operation condition.

It is thus seen that the tool assembly operates in the exact manner that it would if the deburring tool were of the type shown in FIG. 1. However, the tool assembly incorporating the present invention gives substantially improved overall operating results. After the initial assembly and adjustment of the entire tool assembly, there is no need for subsequent adjustments. This is very important in machine shops in which large parts are mass produced and it is necessary to maintain high standards of part sizes and quality. The simple procedure of servicing a large tool assembly makes it possible to maintain the deburring tools in prime condition without excessive "down time" for the machine. When desirable, the operator can have an extra set of cutter rings 14 for use to replace dull cutter rings immediately and then the dull cutter rings can be sharpened and will be available when needed.

What is claimed is:

1. A deburring device comprising, in combination, a tapping tool having a shank, a threaded cutting portion and axially extending chip grooves in said threaded cutting portion, and a deburring device mounted on said tapping tool, said deburring device including a securing ring adjustably secured to the shank of the tapping tool; a spiral compression spring surrounding said tapping tool and having first and second opposite end portions; said first end portion of said spring being operatively connected to said securing ring; said securing ring having an arcuately-extending groove into which at least the first turn of said first end portion of said spring is nested; and, an annular deburring head positioned substantially coaxially with said securing ring and coaxial with and slidable along said threaded cutting portion of the tapping tool; said deburring head comprising: a generally cylindrical mounting ring having first and second ends and a central bore formed therein including a first bore portion at said first end which is slightly larger than the maximum diameter of said cutting portion of the tapping tool, and a second bore portion at said second end and being of larger diameter than said first bore portion; said mounting ring having an annular groove formed at said first end on the periphery thereof in which said second end portion of said compression spring is nested whereby said spring provides a resilient mounting for said deburring head thereby to provide axial movement of said deburring head along said tapping tool; a cutting ring having generally radially extending cutting edges and an axially extending annular collar coaxial with and positioned within said second bore portion of said mounting ring; said annular collar having a peripheral annular groove formed therein located within said second bore portion of said mounting ring; and at least one radially directed set screw extending through the side wall of said second end portion of said mounting ring for engagement with said groove in said annular collar of said cutting ring; said set screw having an inner end portion whose configuration is substantially complementary to the cross section configuration of said groove in said annular collar thereby to locate said cutting ring in a predetermined fixed axial position with respect to said mounting ring and to clamp said cutting ring to said mounting ring in said fixed predetermined position against rotational movement; said cutting ring including cutting means forming said cutting edges and extending into said chip grooves of the tapping tool and preventing rotation of said deburring head relative to the tapping tool, while allowing axial movement of said deburring head relative to the tapping tool.

* * * * *